US010200476B2

(12) United States Patent
Johnson

(10) Patent No.: US 10,200,476 B2
(45) Date of Patent: Feb. 5, 2019

(54) TRAFFIC MANAGEMENT AND REMOTE CONFIGURATION IN A GATEWAY-BASED NETWORK

(75) Inventor: Matthew Johnson, Spokane, WA (US)

(73) Assignee: ITRON, INC., Liberty Lake, WA (US)

(*) Notice: Subject to any disclaimer, the term of this patent is extended or adjusted under 35 U.S.C. 154(b) by 534 days.

(21) Appl. No.: 13/275,759

(22) Filed: Oct. 18, 2011

(65) Prior Publication Data
US 2013/0094396 A1 Apr. 18, 2013

(51) Int. Cl.
H04L 12/28 (2006.01)
H04L 29/08 (2006.01)
H04L 12/58 (2006.01)
H04W 4/50 (2018.01)
G01D 4/00 (2006.01)

(52) U.S. Cl.
CPC .............. H04L 67/12 (2013.01); H04L 51/10 (2013.01); H04L 51/32 (2013.01); H04W 4/50 (2018.02); G01D 4/002 (2013.01); Y02B 90/241 (2013.01); Y02B 90/246 (2013.01); Y04S 20/32 (2013.01); Y04S 20/42 (2013.01)

(58) Field of Classification Search
CPC ........ H04W 4/001; H04L 51/10; H04L 51/32; H04L 67/12
See application file for complete search history.

(56) References Cited

U.S. PATENT DOCUMENTS 4,799,062 A 1/1989 Sanderford, Jr. et al.
4,977,577 A 12/1990 Arthur et al.
4,998,102 A 3/1991 Wyler et al.
5,067,136 A 11/1991 Arthur et al.
5,095,493 A 3/1992 Arthur et al.
5,119,396 A 6/1992 Sanderford, Jr.
5,198,796 A 3/1993 Hessling, Jr.
5,265,120 A 11/1993 Sanderford, Jr.
5,310,075 A 5/1994 Wyler
5,311,541 A 5/1994 Sanderford, Jr.
5,377,222 A 12/1994 Sanderford, Jr.
5,377,232 A 12/1994 Davidov et al.
(Continued)

FOREIGN PATENT DOCUMENTS

JP 08163156 A 6/1996
JP 2008185447 8/2008
(Continued)

OTHER PUBLICATIONS

International Search Report for PCT International Application No. PCT/US11/62799, Search completed Mar. 16, 2012, dated Apr. 11, 2012.

(Continued)

Primary Examiner — Robert M Morlan
Assistant Examiner — Pamit Kaur

(57) ABSTRACT

Disclosed are apparatus and methodology for remotely configuring gateway devices in a gateway-based Advanced Metering Infrastructure (AMI) network. Remotely configurable gateway devices are provided for Internet Protocol (IP) communications between consumption measuring devices and a utility central facility. Communications between the gateway device and central facility may be by way of wired or wireless communications and may include configuration information multicast from the central facility to selected gateway devices.

19 Claims, 2 Drawing Sheets

(56) References Cited

U.S. PATENT DOCUMENTS

| | | |
|---|---|---|
| 5,457,713 A | 10/1995 | Sanderford, Jr. et al. |
| 5,486,805 A | 1/1996 | Mak |
| 5,598,427 A | 1/1997 | Arthur et al. |
| 5,604,768 A | 2/1997 | Fulton |
| 5,626,755 A | 5/1997 | Keyser et al. |
| 5,661,750 A | 8/1997 | Fulton |
| 5,668,828 A | 9/1997 | Sanderford, Jr. et al. |
| 5,696,441 A | 12/1997 | Mak et al. |
| 5,714,931 A | 2/1998 | Petite et al. |
| RE35,829 E | 6/1998 | Sanderford, Jr. |
| 5,801,643 A | 9/1998 | Williams et al. |
| 5,812,547 A | 9/1998 | Benzimra et al. |
| 5,892,758 A | 4/1999 | Argyroudis |
| 5,920,589 A | 7/1999 | Rouquette et al. |
| 5,926,531 A | 7/1999 | Petite |
| 5,933,072 A | 8/1999 | Kelley |
| 5,953,368 A | 9/1999 | Sanderford et al. |
| 5,963,650 A | 10/1999 | Simionescu et al. |
| 5,987,058 A | 11/1999 | Sanderford et al. |
| 5,995,601 A | 11/1999 | Garland et al. |
| 6,028,522 A | 2/2000 | Petite |
| 6,031,883 A | 2/2000 | Sanderford, Jr. et al. |
| 6,044,062 A | 3/2000 | Brownrigg et al. |
| 6,047,016 A | 4/2000 | Ramberg et al. |
| 6,069,571 A | 5/2000 | Tell |
| 6,088,659 A | 7/2000 | Kelley et al. |
| 6,100,816 A | 8/2000 | Moore |
| 6,163,276 A | 12/2000 | Irving et al. |
| 6,178,197 B1 | 1/2001 | Froelich et al. |
| 6,181,258 B1 | 1/2001 | Summers et al. |
| 6,195,018 B1 | 2/2001 | Ragle et al. |
| 6,218,953 B1 | 4/2001 | Petite |
| 6,232,885 B1 | 5/2001 | Ridenour et al. |
| 6,233,327 B1 | 5/2001 | Petite |
| 6,246,677 B1 | 6/2001 | Nap et al. |
| 6,249,516 B1 | 6/2001 | Brownrigg et al. |
| 6,263,009 B1 | 7/2001 | Ramberg et al. |
| 6,335,953 B1 | 1/2002 | Sanderford, Jr. et al. |
| 6,345,294 B1 | 2/2002 | O'Toole et al. |
| 6,363,057 B1 | 3/2002 | Ardalan et al. |
| 6,369,769 B1 | 4/2002 | Nap et al. |
| 6,377,609 B1 | 4/2002 | Brennan, Jr. |
| 6,393,341 B1 | 5/2002 | Lawrence et al. |
| 6,396,839 B1 | 5/2002 | Ardalan et al. |
| 6,424,270 B1 | 7/2002 | Ali |
| 6,426,027 B1 | 7/2002 | Scarborough, III et al. |
| 6,430,268 B1 | 8/2002 | Petite |
| 6,437,692 B1 | 8/2002 | Petite et al. |
| 6,452,986 B1 | 9/2002 | Luxford et al. |
| 6,456,644 B1 | 9/2002 | Ramberg et al. |
| 6,538,577 B1 | 3/2003 | Ehrke et al. |
| 6,604,434 B1 | 8/2003 | Hamilton et al. |
| 6,611,134 B2 | 8/2003 | Chung |
| 6,612,188 B2 | 9/2003 | Hamilton |
| 6,617,879 B1 | 9/2003 | Chung |
| 6,617,976 B2 | 9/2003 | Walden et al. |
| 6,617,978 B2 | 9/2003 | Ridenour et al. |
| 6,618,578 B1 | 9/2003 | Petite |
| 6,618,709 B1 | 9/2003 | Sneeringer |
| 6,626,048 B1 | 9/2003 | Dam Es et al. |
| 6,628,764 B1 | 9/2003 | Petite |
| 6,639,939 B1 | 10/2003 | Naden et al. |
| 6,650,249 B2 | 11/2003 | Meyer et al. |
| 6,657,552 B2 | 12/2003 | Belski et al. |
| 6,671,586 B2 | 12/2003 | Davis et al. |
| 6,684,245 B1 | 1/2004 | Shuey et al. |
| 6,700,902 B1 | 3/2004 | Meyer |
| 6,704,301 B2 | 3/2004 | Chari et al. |
| 6,721,872 B1 | 4/2004 | Dunlop et al. |
| 6,734,663 B2 | 5/2004 | Fye et al. |
| 6,747,557 B1 | 6/2004 | Petite et al. |
| 6,747,571 B2 | 6/2004 | Fierro et al. |
| 6,747,981 B2 | 6/2004 | Ardalan et al. |
| 6,751,563 B2 | 6/2004 | Spanier et al. |
| 6,778,099 B1 | 8/2004 | Meyer et al. |
| 6,784,807 B2 | 8/2004 | Petite et al. |
| 6,792,337 B2 | 9/2004 | Blackett et al. |
| 6,816,538 B2 | 11/2004 | Shuey et al. |
| 6,836,108 B1 | 12/2004 | Balko et al. |
| 6,836,737 B2 | 12/2004 | Petite et al. |
| 6,850,197 B2 | 2/2005 | Paun |
| 6,859,186 B2 | 2/2005 | Lizalek et al. |
| 6,862,498 B2 | 3/2005 | Davis et al. |
| 6,867,707 B1 | 3/2005 | Kelley et al. |
| 6,885,309 B1 | 4/2005 | Van Heteren |
| 6,891,838 B1 | 5/2005 | Petite et al. |
| 6,900,737 B1 | 5/2005 | Ardalan et al. |
| 6,914,533 B2 | 7/2005 | Petite |
| 6,914,893 B2 | 7/2005 | Petite |
| 6,918,311 B2 | 7/2005 | Nathan |
| 6,931,445 B2 | 8/2005 | Davis |
| 6,933,857 B2 | 8/2005 | Foote |
| 6,940,396 B2 | 9/2005 | Hammond et al. |
| 6,965,575 B2 | 11/2005 | Srikrishna et al. |
| 6,972,555 B2 | 12/2005 | Balko et al. |
| 6,982,651 B2 | 1/2006 | Fischer |
| 6,999,008 B2 | 2/2006 | Wang et al. |
| 7,019,667 B2 | 3/2006 | Petite et al. |
| 7,027,773 B1 | 4/2006 | McMillin |
| 7,039,916 B2 | 5/2006 | Jason, Jr. |
| 7,046,682 B2 | 5/2006 | Carpenter et al. |
| 7,053,767 B2 | 5/2006 | Petite et al. |
| 7,054,271 B2 | 5/2006 | Brownrigg et al. |
| 7,079,810 B2 | 7/2006 | Petite et al. |
| 7,089,281 B1 | 8/2006 | Kazemi et al. |
| 7,093,033 B2 | 8/2006 | Beckett et al. |
| 7,103,016 B1 | 9/2006 | Duffy |
| 7,103,511 B2 | 9/2006 | Petite |
| 7,119,713 B2 | 10/2006 | Shuey et al. |
| 7,126,494 B2 | 10/2006 | Ardalan et al. |
| 7,130,719 B2 | 10/2006 | Ehlers et al. |
| 7,137,550 B1 | 11/2006 | Petite |
| 7,184,861 B2 | 2/2007 | Petite |
| 7,185,131 B2 | 2/2007 | Leach |
| 7,209,466 B2 | 4/2007 | Cabana |
| 7,209,840 B2 | 4/2007 | Petite et al. |
| 7,233,830 B1 | 6/2007 | Callaghan et al. |
| 7,263,073 B2 | 8/2007 | Petite et al. |
| 7,272,834 B2 | 9/2007 | Bauman et al. |
| 7,295,128 B2 | 11/2007 | Petite |
| 7,308,370 B2 | 12/2007 | Mason et al. |
| 7,337,191 B2 | 2/2008 | Haeberle et al. |
| 7,346,463 B2 | 3/2008 | Petite et al. |
| 7,379,981 B2 | 5/2008 | Elliott et al. |
| 7,379,997 B2 | 5/2008 | Ehlers et al. |
| 7,397,907 B2 | 7/2008 | Petite |
| 7,424,527 B2 | 9/2008 | Petite |
| 7,447,220 B2 | 11/2008 | Lu et al. |
| 7,467,065 B2 | 12/2008 | Neel et al. |
| 7,468,661 B2 | 12/2008 | Petite et al. |
| 7,480,501 B2 | 1/2009 | Petite |
| 7,516,106 B2 | 4/2009 | Ehlers et al. |
| 7,602,782 B2 | 10/2009 | Doviak et al. |
| RE41,030 E | 12/2009 | Pham et al. |
| 7,650,425 B2 | 1/2010 | Davis et al. |
| 7,697,492 B2 | 4/2010 | Petite |
| 7,702,779 B1 | 4/2010 | Gupta |
| 7,949,615 B2 | 5/2011 | Ehlers et al. |
| 7,965,758 B2 | 6/2011 | Picard |
| 2001/0010032 A1 | 7/2001 | Ehlers et al. |
| 2001/0032232 A1 | 10/2001 | Zombek et al. |
| 2002/0019725 A1 | 2/2002 | Petite |
| 2002/0146985 A1 | 10/2002 | Naden |
| 2002/0169643 A1 | 11/2002 | Petite et al. |
| 2003/0014544 A1 | 1/2003 | Pettey |
| 2003/0036810 A1 | 2/2003 | Petite |
| 2003/0048199 A1 | 3/2003 | Zigdon et al. |
| 2003/0063723 A1 | 4/2003 | Booth et al. |
| 2003/0078029 A1 | 4/2003 | Petite |
| 2003/0093484 A1 | 5/2003 | Petite |
| 2003/0103486 A1 | 6/2003 | Salt et al. |
| 2003/0179149 A1 | 9/2003 | Savage et al. |
| 2004/0004555 A1 | 1/2004 | Martin |
| 2004/0008663 A1 | 1/2004 | Srikrishna et al. |

(56) References Cited

U.S. PATENT DOCUMENTS

| | | |
|---|---|---|
| 2004/0040368 A1 | 3/2004 | Guckenberger et al. |
| 2004/0053639 A1 | 3/2004 | Petite et al. |
| 2004/0061623 A1 | 4/2004 | Tootoonian Mashhad et al. |
| 2004/0062224 A1 | 4/2004 | Brownrigg et al. |
| 2004/0085928 A1 | 5/2004 | Chari et al. |
| 2004/0088083 A1 | 5/2004 | Davis et al. |
| 2004/0091122 A1 | 5/2004 | Bavholm et al. |
| 2004/0113810 A1 | 6/2004 | Mason, Jr. et al. |
| 2004/0117330 A1 | 6/2004 | Ehlers et al. |
| 2004/0131125 A1 | 7/2004 | Sanderford, Jr. et al. |
| 2004/0133314 A1 | 7/2004 | Ehlers et al. |
| 2004/0138786 A1 | 7/2004 | Blackett et al. |
| 2004/0138981 A1 | 7/2004 | Ehlers et al. |
| 2004/0139038 A1 | 7/2004 | Ehlers et al. |
| 2004/0183687 A1 | 9/2004 | Petite et al. |
| 2004/0192415 A1 | 9/2004 | Luglio et al. |
| 2004/0218616 A1 | 11/2004 | Ardalan et al. |
| 2004/0264379 A1 | 12/2004 | Srikrishna et al. |
| 2004/0264435 A1 | 12/2004 | Chari et al. |
| 2005/0024235 A1 | 2/2005 | Shuey et al. |
| 2005/0030199 A1 | 2/2005 | Petite et al. |
| 2005/0036487 A1 | 2/2005 | Srikrishna |
| 2005/0043059 A1 | 2/2005 | Petite et al. |
| 2005/0043860 A1 | 2/2005 | Petite |
| 2005/0052290 A1 | 3/2005 | Naden et al. |
| 2005/0052328 A1 | 3/2005 | De Angelis |
| 2005/0065742 A1 | 3/2005 | Rodgers |
| 2005/0068193 A1 | 3/2005 | Osterloh et al. |
| 2005/0068970 A1 | 3/2005 | Srikrishna et al. |
| 2005/0074015 A1 | 4/2005 | Chari et al. |
| 2005/0091335 A1 | 4/2005 | Tapia et al. |
| 2005/0129005 A1 | 6/2005 | Srikrishna et al. |
| 2005/0147097 A1 | 7/2005 | Chari et al. |
| 2005/0163144 A1 | 7/2005 | Srikrishna et al. |
| 2005/0169020 A1 | 8/2005 | Knill |
| 2005/0171696 A1 | 8/2005 | Naden et al. |
| 2005/0172024 A1 | 8/2005 | Cheifot et al. |
| 2005/0190055 A1 | 9/2005 | Petite |
| 2005/0195768 A1 | 9/2005 | Petite et al. |
| 2005/0195775 A1 | 9/2005 | Petite et al. |
| 2005/0201397 A1 | 9/2005 | Petite |
| 2005/0218873 A1 | 10/2005 | Shuey et al. |
| 2005/0226179 A1 | 10/2005 | Behroozi |
| 2005/0243867 A1 | 11/2005 | Petite |
| 2005/0251401 A1 | 11/2005 | Shuey |
| 2005/0251403 A1 | 11/2005 | Shuey |
| 2005/0271006 A1 | 12/2005 | Chari et al. |
| 2005/0278440 A1 | 12/2005 | Scoggins |
| 2006/0002350 A1 | 1/2006 | Behroozi |
| 2006/0012935 A1 | 1/2006 | Murphy |
| 2006/0015945 A1 | 1/2006 | Fields |
| 2006/0018303 A1 | 1/2006 | Sugiarto et al. |
| 2006/0038548 A1 | 2/2006 | Shuey |
| 2006/0043961 A1 | 3/2006 | Loy |
| 2006/0056459 A1 | 3/2006 | Stratton et al. |
| 2006/0071810 A1 | 4/2006 | Scoggins et al. |
| 2006/0071812 A1 | 4/2006 | Mason, Jr. et al. |
| 2006/0079999 A1 | 4/2006 | Husein |
| 2006/0098576 A1 | 5/2006 | Brownrigg et al. |
| 2006/0114121 A1 | 6/2006 | Cumeralto et al. |
| 2006/0136583 A1 | 6/2006 | Helmstetter et al. |
| 2006/0184667 A1 | 8/2006 | Clubb et al. |
| 2007/0097940 A1 | 5/2007 | Yuen |
| 2007/0135973 A1 | 6/2007 | Petite |
| 2007/0161385 A1 | 7/2007 | Anderson |
| 2007/0206591 A1 | 9/2007 | Doviak et al. |
| 2007/0214232 A1 | 9/2007 | Belimpasakis et al. |
| 2007/0241739 A1 | 10/2007 | Uenou et al. |
| 2007/0283001 A1 | 12/2007 | Spiess et al. |
| 2008/0042871 A1 | 2/2008 | Donaghey et al. |
| 2008/0068994 A1 | 3/2008 | Garrison Stuber et al. |
| 2008/0074285 A1* | 3/2008 | Guthrie ............... 340/870.02 |
| 2008/0150750 A1 | 6/2008 | Parris et al. |
| 2008/0186898 A1 | 8/2008 | Petite |
| 2009/0068947 A1 | 3/2009 | Petite |
| 2009/0109056 A1 | 4/2009 | Tamarkin et al. |
| 2009/0146839 A1 | 6/2009 | Reddy et al. |
| 2010/0045447 A1 | 2/2010 | Mollenkopf et al. |
| 2010/0195574 A1* | 8/2010 | Richeson ............... G01D 4/004 370/328 |
| 2011/0035510 A1 | 2/2011 | Alexander |
| 2011/0085525 A1 | 4/2011 | Patini |
| 2011/0158160 A1* | 6/2011 | McCullough ......... H04W 40/02 370/328 |
| 2011/0161478 A1 | 6/2011 | Formo et al. |
| 2011/0184676 A1* | 7/2011 | Gershinsky ............. H04Q 9/00 702/62 |
| 2011/0202190 A1 | 8/2011 | Venkatakrishnan et al. |
| 2011/0214068 A1* | 9/2011 | Neal ...................... G06Q 10/10 715/751 |
| 2012/0155463 A1* | 6/2012 | Vasseur et al. ............... 370/390 |
| 2013/0028296 A1* | 1/2013 | Khandekar .......... H04B 1/7075 375/142 |
| 2013/0048746 A1* | 2/2013 | Littrell ................... G05B 15/02 239/1 |

FOREIGN PATENT DOCUMENTS

| | | |
|---|---|---|
| JP | 2010536199 | 11/2010 |
| JP | 2011062075 | 3/2011 |
| WO | WO 2009/067262 | 5/2009 |
| WO | WO 2009067262 A2 * | 5/2009 |
| WO | WO2011116849 | 9/2011 |

OTHER PUBLICATIONS

Written Opinion of the International Searching Authority for PCT International Application No. PCT/US11/62799, opinion completed Mar. 17, 2012, dated Apr. 11, 2012.

Reissued Patent No. Re. 35,829 entitled "Binary Phase Shift Keying Modulation System and/or Frequency Multiplier" by Sanderford, Jr., Reissued Date of Patent: Jun. 23, 1998.

National Electrical Manufacturers Association, "Protocol Specification for Interfacing to Data Communication Networks", ANSI Std. C12.22-199x, Sep. 30, 1999.

Gyozo Kmethy, "Meter data exchange—standardization for interoperability", Hungarian Institute of Standards, *Metering International*, Issue 3 2000.

Ted York, "Exploring ANSI Standards in Meter Communications", *Electricity Today*, Sep. 2000.

Keith Martin, "Beware of Standards that Speak with Forked Tongue", *Energy Pulse*, Jan. 2006.

Mark Michaelis, *Essential C# 2.0*, Jul. 2006.

Jennifer Hicks, "Software helps users manage automation assets", PAS, Inc., Jul. 18, 2006.

"Software provides managed environment for information", Bentley Systems Inc., Jul. 18, 2006.

UtiliPoint International Inc., IssueAlert, "Open Protocols for AMI Open Door to Flexibility and Innovation", Jul. 26, 2006.

National Electrical Manufacturers Association, "Protocol Specification for Interfacing to Data Communication Networks", ANSI Std. C12.22-200x, Aug. 21, 2006.

International Search Report for PCT International Application No. PCT/US07/19043 dated Jul. 29, 2008.

International Search Report for PCT International Application No. PCT/US07/19047 dated Sep. 9, 2008.

International Search Report for PCT International Application No. PCT/US07/19051 dated Sep. 16, 2008.

Office Action for U.S. Appl. No. 11/897,233 dated Nov. 9, 2009.

International Search Report for PCT International Application No. PCT/US2011/030239, completed May 18, 2011, dated May 31, 2011.

Written Opinion of the International Searching Authority for PCT International Application No. PCT/US2011/030239 completed May 18, 2011, dated May 31, 2011.

May 2, 2012 Office Action for Canadian Patent Application No. 2,755,459.

(56) References Cited

OTHER PUBLICATIONS

Jan. 30, 2013 Office Action for Canadian Patent Application No. 2,755,459.
Feb. 13, 2013 Office Action issued for U.S. Appl. No. 12/761,746.
Translated Japanese Office Action dated Sep. 24, 2014 for Japanese patent application No. 2014-537051, a counterpart foreign application of U.S. Appl. No. 13/275,759, 6 pages.
The Canadian Office Action dated Jul. 25, 2013 for Canadian patent application No. 2755459, a counterpart foreign application of U.S. Appl. No. 13/275,759, 8 pages.
Non-Final Office Action for U.S. Appl. No. 11/879,234, dated Aug. 30, 2013 from USPTO, 21 pages.
The Australian Office Action dated Feb. 26, 2015 for Australian patent application No. 2011379364, a counterpart foreign application of U.S. Appl. No. 13/275,759, 3 pages.
Translated Japanese Office Action dated Feb. 17, 2015 for Japanese patent application No. 2014-537051, a counterpart foreign application of U.S. Appl. No. 13/275,759, 4 pages.
Skyley Networks, "Introduction of 802.15.4/ZigBee Solution," Slide 8, retrieved from <<http://www.skyley.com/products/seminor2009090301.pdf>> Sep. 3, 2009.
The Extended European Search Report dated Jul. 10, 2015 for European Patent Application No. 11874247.7, 6 pages.
Notice of Acceptance for Australian Patent Application No. 2011379364, dated Dec. 23, 2015, 2 pages.
Extended European Search Report dated Apr. 5, 2017, for European Patent Application No. 16200108.5, 8 pages.

\* cited by examiner

TRAFFIC MANAGEMENT AND REMOTE CONFIGURATION IN A GATEWAY-BASED NETWORK

FIELD OF THE SUBJECT MATTER

The presently disclosed subject matter relates to communications networks. More particularly, the presently disclosed subject matter is directed to apparatus and methodologies for traffic management including remote configuration in gateway-based networks.

BACKGROUND OF THE SUBJECT MATTER

In a typical advanced metering infrastructure (AMI) network, a collector may provide coverage for 1000 to 10,000 meters. By contrast, in a gateway-based network, a gateway may read a few meters, often just a single meter. In the gateway-based network, the traffic management and collector configuration issues are magnified by such difference in the collector to meter scale or ratio.

Various prior U.S. patent publication documents have addressed network communications, including such as U.S. Pat. No. 6,345,294 to O'Toole et al. entitled "Methods And Apparatus For Remote Configuration Of An Appliance On A Network;" U.S. Pat. No. RE. 41,030 to Pham et al. entitled "System And Method Of Network Independent Remote Configuration On Internet Server Appliance;" and U.S. Patent Application Publication Number U.S. 2006/0079999 to Husein entitled "Building Management With Remote Configuration." The disclosures of all of the publication citations herein are fully incorporated herein by reference, for all purposes.

While various implementations of networks have been developed, and while various combinations of management and configuration implementations have be made available, no design has emerged that generally encompasses all of the desired characteristics as hereafter presented in accordance with the presently disclosed subject matter.

SUMMARY OF THE SUBJECT MATTER

In view of the recognized features encountered in the prior art and addressed by the presently disclosed subject matter, an improved Advanced Metering Infrastructure (AMI) has been provided comprising, for example, at least one remotely configurable gateway, at least one utility consumption measuring device coupled for communications with such at least one remotely configurable gateway, an Internet Protocol (IP) based communications network, and at least one utility central facility server coupled for communications over such network. Preferably, in such exemplary embodiment, such at least one remotely configurable gateway is coupled for IP-based communications with such network so that configuration data may be multicast from such at least one utility central facility server to such at least one remotely configurable gateway.

In certain present exemplary embodiments, the at least one remotely configurable gateway may be coupled for wireless communications with the network while in other present exemplary embodiments the gateway may be coupled for wired communications with the network.

In yet other present exemplary embodiments, the gateway may be configured for communications with a plurality of consumption measuring devices and may be configured to communicate wirelessly or by wired communications with the plurality of consumption measuring devices. In certain present embodiments, the gateway may be coupled for two-way IP-based communications with the network.

The presently disclosed subject matter also equally relates to corresponding and/or associated methodology. One present exemplary method may relate to configuring a gateway coupled between one or more utility consumption measuring devices and a utility provider, comprising coupling at least one utility consumption measuring device to a remotely configurable gateway for Internet Protocol (IP) based communications with an Internet Service Provide (ISP), coupling a utility provider central facility server to the ISP via an Internet Protocol (IP) based communications network, and multicasting configuration information from the utility provider central facility server to the gateway.

Additional embodiments of the presently disclosed subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the presently disclosed subject matter without departing from the spirit and scope of the presently disclosed subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized embodiments above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended figure, in which.

Figure 1:
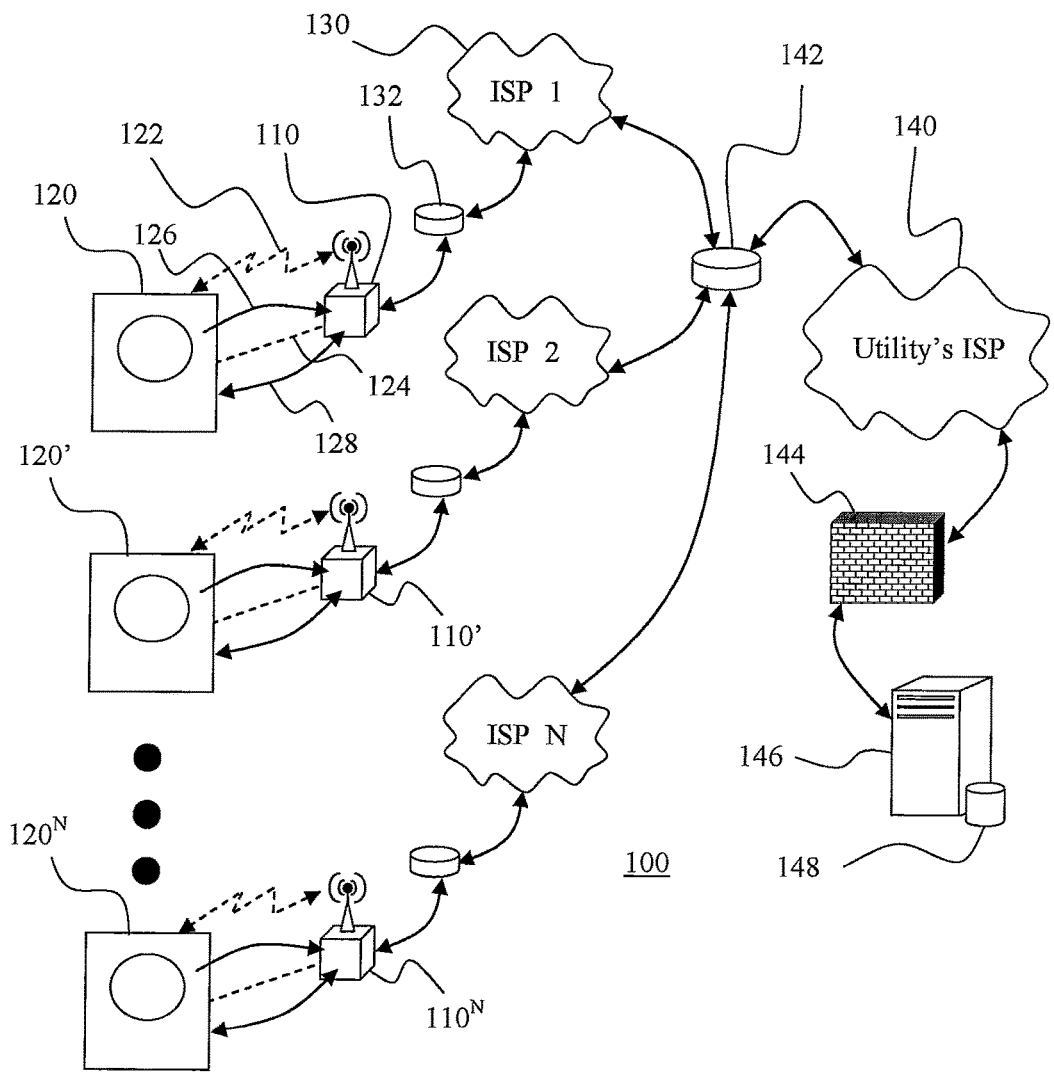
FIG. 1 is a block diagram of an exemplary advanced metering infrastructure (AMI) incorporating the presently disclosed subject matter.

Repeat use of reference characters throughout the present specification and appended drawings is intended to represent same or analogous features, elements, or steps of the presently disclosed subject matter.

DETAILED DESCRIPTION OF THE SUBJECT MATTER

As discussed in the Summary of the Subject Matter section, the presently disclosed subject matter is particularly concerned with the provision of multicasting capabilities within a gateway-based network to rapidly implement configuration and/or reconfiguration of a gateway device or devices.

Selected combinations of aspects of the presently disclosed subject matter correspond to a plurality of different embodiments of the presently disclosed subject matter. It should be noted that each of the exemplary embodiments presented and discussed herein should not insinuate limitations of the presently disclosed subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference is made herein in detail to exemplary presently preferred embodiments of the subject Traffic Management and Remote Configuration operations in a Gateway-Based AMI Network. Referring to the drawings, FIG. 1 illustrates a block diagram of an exemplary Advanced Metering Infrastructure (AMI) generally 100 incorporating the presently disclosed subject matter.

Several considerations differentiate the implementation of AMI 100 in accordance with the presently disclosed subject matter from prior standard such networks. In a first aspect, gateways 110, 110', ..., 110$^N$ are provided at a utility service location to convert information from utility consumption measurement devices such as meters 120, 120', ..., 120$^N$ to an Internet Protocol (IP) based communications protocol. Respective communications connections from meters 120, 120', ..., 120$^N$ to gateways 110, 110', ..., 110$^N$ may correspond to either representative wireless connection 122 or representative wired connection 124. In addition, connections 122, 124 may correspond to one-way connections 126 from meters 120, 120', ..., 120$^N$ or two-way connections 128 as required or as appropriate or as desired. Those of ordinary skill in the art will appreciate that each of the gateways 110, 110', ..., 110$^N$ provide the same combination of communications possibilities although labeling of connections is not included in order to avoid unnecessary clutter of the present illustrations.

Those of ordinary skill in the art should also appreciate that, in accordance with the presently disclosed subject matter, each of the alternative communications options may be paired with each of the alternate communications mediums, and that the same combination is not required for each situation. In other words, one-way communications may per presently disclosed subject matter be provided in an individual configuration over wireless or wired communications channels or, alternatively, two way communications may be similarly provided over either wireless or wired communications channels.

A second aspect of the presently disclosed subject matter provides that information from, or alternatively to and from, meters 120, 120', ..., 120$^N$ will then be routed from the various gateway 110, 110', ..., 110$^N$ devices to and/or from the utility over a combination of private, i.e., consumer, networks including representative private ISP 130 via appropriate exemplary coupling devices 132, and public networks representatively illustrated as coupling device 142 to a utility via their own ISP 140.

As with all transmissions that occur across public networks, and as will be well understood by those of ordinary skill in the art, routing and security concerns should be addressed. In accordance with presently disclosed subject matter, security measures may be addressed at least in part by way of the provision of a firewall 144 providing protection for the utility's central facility including server 146 and associated data storage 148.

Further in accordance with presently disclosed subject matter, data communication between utility consumption sites and utility providers, whether such is one-way or two-way and whether conducted wirelessly or via wired communications or combinations thereof, may be configured to operate under multiple methodologies. For example, in exemplary configurations, a network configured in accordance with the presently disclosed subject matter may be operated as a Polling-Based Network or as a Push-Based System.

When operated as a Polling-Based Network, acquisition of meter readings, in a first exemplary configuration, may be controlled from the utility's systems by polling gateways 110, 110', ..., 110.sup.N to return time-stamped information read from utility consumption measurement devices such as meters 120, 120', ..., 120.sup.N that an individual gateway 110, 110', ..., 110.sup.N holds in its memory. Alternatively, in a second exemplary configuration, the utility system may control gateways 110, 110', ..., 110.sup.N to request the most current information from each associated meter 120, 120', ..., 120.sup.N, as well as any other information that may be held in the meter's memory that the utility may request. Such request may be made either concurrently with a present communication or from a previous communication. It should be further appreciated that the utility system may also control gateways 110, 110', ..., 110.sup.N to request information from other types of devices including without limitation other endpoints, transformers, relays, routers, and other systems and devices from which information significant to the utility may be collected. Those of ordinary skill in the art will appreciate without requiring additional discussion that multiple requests can be sent and handled by multiple software and/or hardware processors to increase the throughput of such polling approach.

When the AMI in accordance with the presently disclosed subject matter is operated as a Push-Based System embodiment, the various gateway devices may be configured by the utility to periodically push readings and other relevant information including, for example, alarms, tampers, etc., to the utility's head-end systems. Optionally, as part of a push, the individual gateways 110, 110', ..., 110$^N$ may check for pending requests from the head-end to send any other information that the utility desires. Responses for such requests may come from the gateway's memory or from interrogation of the meter or the meter's own memory.

In accordance with the presently disclosed subject matter, configuration of the gateway itself may be undertaken as a portion of such communications. When considering network traffic management configuration for gateway-based networks, a number of options are available to the end user. These include, for example, consideration of whether the configuration would include assignment of a gateway to a specific meter or group of meters, or type of meter or if it should report every meter it hears.

Alternatively, consideration may be given to whether the gateway should only report meters it hears reliably based on a reception frequency or signal strength threshold or meters that belong to a certain utility. Such parameters may be configured from the utility's central facility including server 146 and recorded in a memory associated with the gateway. Additional configuration parameters might also include settings that insure that a meter's reading is real and reliable before reporting or that might be used to configure a schedule for how often to push data and what data to push.

In typical systems, a modest amount of system resources are spent on traffic management and other configuration of collectors. Such configurations include setting filtering parameters, setting schedules for various operations, and returning radio performance statistics.

In a gateway-based system, in accordance with the presently disclosed subject matter, a low overhead approach is taken to manage the large number of gateways 110, regardless of the push or polled paradigm of the network. One approach is to configure gateways on a one-by-one basis, such as when the device is polled or as a response when a gateway pushes its readings.

In accordance with the presently disclosed subject matter, a more efficient methodology has been provided through the implementation of a multicast approach to gateway configuration that provides significant advantage regardless of whether a push or polled network architecture is employed or occurring. Multicast addressing provides delivery of data to a group of destinations, for example, gateways, simultaneously by transmitting messages over the network only once.

In accordance with the presently disclosed subject matter, individual gateways 110 are assigned to one or more multicast groups. Such group assignments might be made in accordance with utility type, i.e., electric, gas, or water; geographic areas including routes or districts; the particular Internet Service Provider (ISP) serving the gateway; or by service type, that is, based on whether the service is residential or commercial.

Multicast transmission of gateway configuration information provides a mechanism whereby a large numbers of nodes may be rapidly configured with a high degree of reliability. Typically per practice of the presently disclosed subject matter, only a few multicasts of a configuration are required to deliver configuration instructions to greater than 95-98% of the multicast subscribers.

The ability provided to utilities by the presently disclosed subject matter may be employed in a number of ways that could be of significant value to a utility. For example, such ability could be used to rapidly configure and/or reconfigure a large number of gateways to assist in determining the extent of a power or service outage. Under such circumstances, gateways that may have been previously configured to report data from a single meter that they were paired with could be quickly reconfigured to report all meters that they can hear. Such a reconfiguration could easily be used to map a power outage or identify that certain of the serving ISP's or a customer's premises equipment (CPE) wasn't powered, but that electricity had been restored.

The presently disclosed subject matter also permits exploitation of public broadband networks for the collection and transmission of meter reading data, as well as for providing a mechanism to manage network traffic including providing remote configuration of gateways while avoiding the installation of specifically purposed collection infrastructure. Such approach of the presently disclosed subject matter inherently reduces potential infrastructure cost, of course, but also increases deployment flexibility for utilities.

Figure 2:
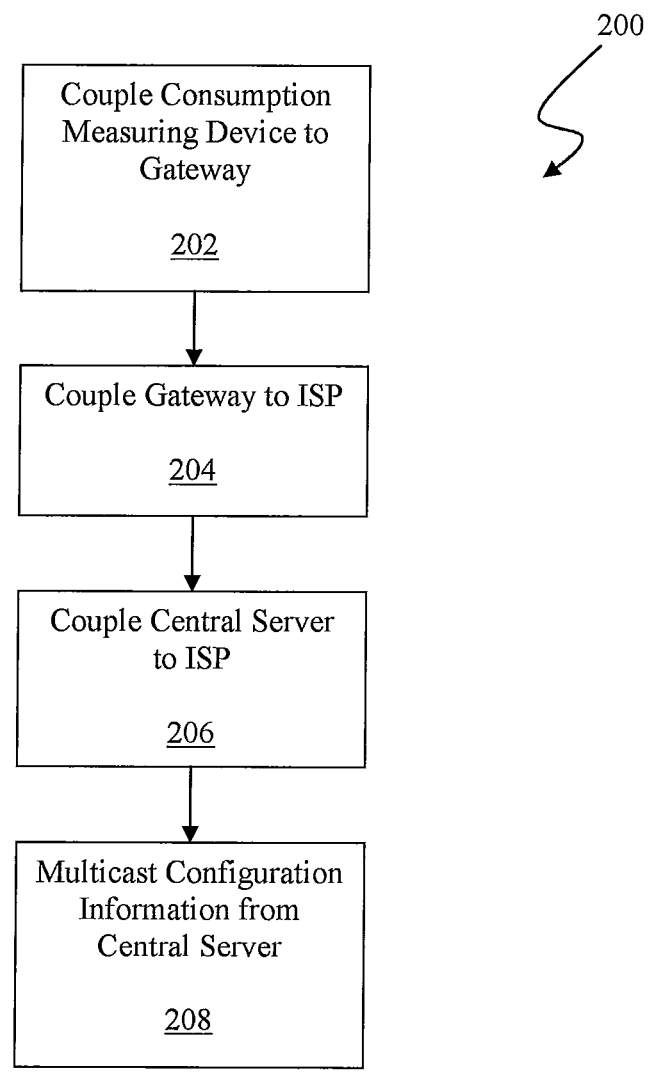
FIG. 2 illustrates a flow chart of an exemplary methodology that may be employed to configure a gateway in accordance with the presently disclosed subject matter.

With present reference to FIG. 2 there is illustrated a flow chart 200 of an exemplary methodology usable to configure a gateway in accordance with the presently disclosed subject matter. As described herein, the presently disclosed subject matter provides for coupling a consumption measuring device (step 202) to a gateway, for example, gateway 110 and meter 120, both of FIG. 1. As should be apparent to those of ordinary skill in the art, such consumption device may correspond to any measuring device capable of measuring and/or recording consumption of any product or resource including, without limitation, electricity, water, gas, oil or any other such consumable resources. Further, as previously discussed, such coupling may take on multiple forms including both wired and wireless as well as one way and two way communications capabilities or combinations thereof.

Further in accordance with methodologies of the presently disclosed subject matter, the gateway is coupled (step 204) to an Internet Service Provided (ISP). In a manner similar to coupling the gateway to an ISP, a Central Server is also couple (step 206) to an ISP for Internet Protocol communications therewith. In certain embodiments, the ISP to which the gateway is coupled may be the same ISP to which the Central Server is couple or a different ISP so that an interim coupling device may be provide to couple the ISP coupled to the gateway to the ISP coupled to the Central Server.

Finally, following coupling of the gateway and Central Server to an ISP, configuration information for the gateway is multicast (step 208) to program or reprogram the gateway. It should be appreciated that multiple gateways may be couple to the Central Server via one or more ISP connections and that each of these gateways may be programmed by way of the multicast transmission.

While the presently disclosed subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure and appended claims is by way of example rather than by way of limitation, and the subject disclosure does not preclude inclusion of such modifications, variations, and/or additions to the presently disclosed subject matter as would be readily apparent to one of ordinary skill in the art.

What is claimed is:

1. An Advanced Metering Infrastructure (AMI), comprising:
   a plurality of remotely configurable gateways;
   a plurality of consumption measuring devices coupled for communications with the plurality of remotely configurable gateways, wherein each consumption measuring device is assigned to a group that is associated with one of the plurality of remotely configurable gateways; and
   at least one central facility server coupled for communications over one or more IP-based communications networks, wherein the at least one central facility server is configured to:
      multicast configuration information from the at least one central facility server to the plurality of remotely configurable gateways; and
      reconfigure a selected gateway from among the plurality of remotely configurable gateways from being configured to report consumption data from a respective group of one or more consumption measuring devices associated with the selected gateway, to being configured to report consumption data from all consumption measuring devices it hears, wherein the consumption measuring devices that the selected gateway hears and is reconfigured to report on include consumption measuring devices that are not paired with the selected gateway.

2. The AMI of claim 1, wherein the configuration information assigns the selected gateway to report data from at least one specific consumption measuring device.

3. The AMI of claim 1, wherein the configuration information assigns the selected remotely configurable gateway to report data from a specific type of consumption measuring device.

4. The AMI of claim 1, wherein the configuration information configures the selected remotely configurable gateway to operate within a Polling-Based Network.

5. The AMI of claim 1, wherein the configuration information configures the selected remotely configurable gateway to operate within a Push-Based System.

6. The AMI of claim 1, wherein the configuration information configures the selected remotely configurable gateway into two or more multicast groups, each of the two or more multicast groups comprising:
- a utility-type multicast group;
- a geographic area based multicast group;
- an internet service provider based multicast group; or
- a service type multicast group based on residential vs. commercial service.

7. The AMI of claim 1, wherein the configuration information instructs the remotely configurable gateway to assist in determining an extent of a power or service outage at least in part by instructing the remotely configurable gateway to report data from all consumption measuring devices that it can hear.

8. A method for changing a configuration of a remotely configurable gateway, wherein the remotely configurable gateway is coupled between one or more utility consumption measuring devices and a utility provider, the method comprising:
- communicating with at least one utility consumption measuring device using Internet Protocol (IP) based communications;
- communicating with the utility provider; and
- receiving configuration information via multicast from the utility provider, wherein the configuration information reconfigures the remotely configurable gateway from reporting consumption data from a group of one or more utility consumption measuring devices associated with the remotely configurable gateway to reporting consumption data from all of the utility consumption measuring devices that are heard by the remotely configurable gateway, wherein the utility consumption measuring devices that are heard by the remotely configurable gateway, and are to be reported on by the remotely configurable gateway, include utility consumption measuring devices that are not paired with the remotely configurable gateway.

9. The method of claim 8, wherein the configuration information configures the remotely configurable gateway to periodically push readings, alarms and/or tampers to the utility provider.

10. The method of claim 8, wherein the configuration information configures the remotely configurable gateway to return time-stamped information in response to polling by the utility provider.

11. The method of claim 8, wherein the configuration information configures the remotely configurable gateway to set filtering parameters, set schedules for operations and return radio performance statistics to the utility provider.

12. The method of claim 8, wherein the configuration information configures the remotely configurable gateway, previously configured to report data from a single utility consumption measuring device, to report data from all utility consumption measuring devices heard by the remotely configurable gateway.

13. A method by which a computing device of a utility provider sends configuration information to a plurality of remotely configurable gateways, the remotely configurable gateways in communication with one or more utility consumption measuring devices in an Internet Protocol (IP) based communications network, the method comprising:
- multicasting configuration information to the plurality of remotely configurable gateways; and
- reconfiguring a selected gateway of the plurality of remotely configurable gateways according to the configuration information from reception of consumption information from only utility consumption measuring devices in a respective group associated with the selected gateway to reception of consumption information from all utility consumption measuring devices that are heard by the selected gateway, wherein the utility consumption measuring devices that the selected gateway hears and from which the selected gateway is reconfigured to receive consumption information, include utility consumption measuring devices that are not paired with the selected gateway.

14. The method of claim 13, wherein the configuration information reconfigures the selected gateway to perform in a different manner.

15. The method of claim 13, wherein the configuration information assigns the selected gateway to report only utility consumption measuring devices it hears reliably with a signal strength over a threshold value.

16. The method of claim 13, wherein the configuration information configures the selected gateway to operate within a Polling-Based Network.

17. The method of claim 13, wherein the configuration information configures the selected gateway to operate within a Push-Based System.

18. The method of claim 13, wherein the configuration information configures each of the selected gateways, previously configured to report data from a single utility consumption measuring device, to report data from all utility consumption measuring devices heard by the selected gateway.

19. The method of claim 13, wherein the configuration information assigns the selected gateway to report data from a specific type of utility consumption measuring device.

* * * * *